Patented Sept. 8, 1936

2,053,439

UNITED STATES PATENT OFFICE 2,053,439

PURIFICATION OF ETHER

Ferdinand W. Nitardy, Brooklyn, N. Y., assignor to E. R. Squibb & Sons, New York, N. Y., a corporation of New York No Drawing. Application August 24, 1932, Serial No. 630,243

7 Claims. (Cl. 260—151)

This invention relates to the purification of ether.

Aldehydes form in ether during its manufacture (as by the oxidation of ethyl alcohol in the presence of sulfuric acid) and subsequently (by the decomposition of peroxides), and constitute an impurity that tends to make the ether unfit for anesthetic use.

It is the object of this invention to provide an efficient method of removing aldehydes from ether.

In the practice of this invention ether is contacted with a bisulfite solution; and, preferably, then with an alkali, to remove any sulfur dioxide introduced by the bisulfite treatment. Preliminary alkali treatment is desirable in order to remove from the ether any acidic materials that might decompose the bisulfite; the ether may be in the liquid or the vapor state; the contact should be thorough, and may be effected by mixing the liquid ether with the reactant or passing the ether vapor through suitable scrubbing towers; treatment with a substance capable of readily yielding bisulfites, as hydrosulfites by decomposition in water, is of course equivalent to contact with bisulfites; the bisulfite is preferably dissolved in water or in a mixture of water with a nonvolatile water-miscible solvent such as glycerin or ethylene glycol, a mixture of this kind having the advantage of facilitating control of the content of water and alcohol in the ether, U. S. P. proportions thereof being generally desirable; where the ether vapor is treated, the temperature in the bisulfite scrubber should be kept high enough to prevent the ether from condensing, but not much higher; the alkali treatment should occur soon after the bisulfite treatment; and solid magnesium hydroxide and calcium hydroxide, and various other substances having an alkaline reaction sufficiently strong to combine with sulfur dioxide, are among the "alkalies" that may be used.

By employing the method of this invention it is possible to reduce aldehydes in ether from a proportion many times in excess of that ordinarily found in anesthetic ether, to less than one part of aldehyde in a million parts of ether.

As an example, a liter of ordinary ether, containing approximately 50 parts per million of acetaldehyde, is shaken for a half hour with 50 cc. of concentrated aqueous sodium bisulfite solution; the ether is separated, and is then distilled through a 1-foot column of 5% aqueous sodium hydroxide solution in a bottle filled with broken glass, and is condensed. A test shows aldehydes to be absent.

As a further example, a continuous stream of ether vapor is passed successively through two scrubbers maintained at between 40° and 80° C., one of them a vessel containing a 6-inch column of 45% aqueous sodium bisulfite solution and the other a vessel containing a 1-foot column of 5% aqueous sodium hydroxide solution, both being filled with contact material, such as cracked glass, and having at their bottom a wire screen for breaking up the ether bubbles. A negative test for aldehydes is obtained.

Even if the concentration of the aqueous sodium bisulfite in this example is only 5% and the ether treated contains 800 parts per million of acetaldehyde, the aldehydes are removed so completely that their presence is not revealed by a test senstive to one part of aldehyde per million.

As a still further example, a more or less conventional apparatus is provided consisting of a cylindrical chamber, a superposed tower, and an intermediate screen supporting porcelain chips filling the tower. Sufficient saturated aqueous sodium bisulfite solution is poured in at the top of the tower to fill the chamber and the major part of the tower. Ether is forced into the chamber and thoroughly mixed with the bisulfite solution by means of an agitator, and the mixture passes up through the tower. In the upper part of the tower, containing only the porcelain chips, rapid and complete separation of the ether from the bisulfite solution takes place on account of the differential specific gravities. From the top of the tower the ether is led into a storage receptacle, and from the latter to the bottom of a tall cylindrical container, for example a pipe, having a bottom screen and filled with porcelain chips and also partly with strong, preferably about 38.3%, aqueous sodium hydroxide solution. After passing up through this alkali solution, the ether is led from the top of the alkali tower to a suitable storage vessel. No aldehydes are disclosed by a test sensitive to one part of aldehyde per million. Optimal rate of flow may, of course, be determined from the ether treated, the solutions used, and the constants of the apparatus. It is advantageous to have the ether pass first through an alkali scrubber, then a bisulfite scrubber, and finally another alkali scrubber.

It is to be understood that the foregoing examples are merely illustrative and by no means limitative of the invention, which may be variously otherwise embodied, for instance, as to the specific bisulfite solutions and alkalies used and the

I claim:

1. The method of reducing the aldehyde content of ether from less than one hundred parts per million to less than ten parts per million that comprises contacting the ether with a bisulfite solution containing a nonvolatile water-miscible alcohol.

2. The method of reducing the aldehyde content of ether from less than one hundred parts per million to less than ten parts per million that comprises contacting the ether successively with a bisulfite solution containing a nonvolatile water-miscible alcohol and with an alkali.

3. The method of reducing the aldehyde content of ether from less than one hundred parts per million to less than ten parts per million that comprises contacting the ether successively with an alkali, a bisulfite solution, and an alkali.

4. The method of reducing the aldehyde content of ether from less than one hundred parts per million to less than ten parts per million that comprises contacting the ether successively with an aqueous sodium hydroxide solution, an aqueous sodium bisulfite solution, and an aqueous sodium hydroxide solution.

5. The method of removing aldehydes from ether that comprises contacting the ether with a solution of a bisulfite in a mixture of water with a nonvolatile water-miscible solvent consisting of an alcohol.

6. The method of removing aldehydes from ether that comprises contacting the ether with a solution of a bisulfite in a mixture of water with ethylene glycol.

7. The method of removing aldehydes from ether that comprises contacting the ether successively first with a solution of a bisulfite in a mixture of water with ethylene glycol and then with an alkali.

FERDINAND W. NITARDY.